US011483967B1

(12) United States Patent
Grove et al.

(10) Patent No.: US 11,483,967 B1
(45) Date of Patent: Nov. 1, 2022

(54) METHOD OF CONVERSION TO AUTOMATED LAWN MOWER

(71) Applicants: Gavyn Grove, Madison, AL (US); Joseph Martin, Cullman, AL (US); Matthew L'Antigua, Huntsville, AL (US); Rahul Rameshbabu, Madison, AL (US); Tyler Oliger, Huntsville, AL (US); Farbod Fahimi, Owens Crossroads, AL (US)

(72) Inventors: Gavyn Grove, Madison, AL (US); Joseph Martin, Cullman, AL (US); Matthew L'Antigua, Huntsville, AL (US); Rahul Rameshbabu, Madison, AL (US); Tyler Oliger, Huntsville, AL (US); Farbod Fahimi, Owens Crossroads, AL (US)

(73) Assignee: Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 784 days.

(21) Appl. No.: 16/272,814

(22) Filed: Feb. 11, 2019

Related U.S. Application Data

(60) Provisional application No. 62/628,694, filed on Feb. 9, 2018.

(51) Int. Cl.
*A01D 34/00* (2006.01)
*A01D 34/63* (2006.01)

(52) U.S. Cl.
CPC .......... *A01D 34/008* (2013.01); *A01D 34/63* (2013.01)

(58) Field of Classification Search
CPC .............................. A01D 34/008; A01D 34/63
See application file for complete search history.

(56) References Cited

U.S. PATENT DOCUMENTS

| 3,800,902 | A | * | 4/1974 | Keller | ..................... | B62D 1/24 |
| | | | | | | 180/167 |
| 3,924,389 | A | * | 12/1975 | Kita | ....................... | B60L 50/16 |
| | | | | | | 56/10.2 A |
| 4,318,266 | A | * | 3/1982 | Taube | ................ | A01D 34/008 |
| | | | | | | 56/10.2 R |
| 4,694,639 | A | * | 9/1987 | Chen | ..................... | A01D 34/008 |
| | | | | | | 250/202 |
| 2003/0144774 | A1 | * | 7/2003 | Trissel | ................ | A01D 34/008 |
| | | | | | | 701/23 |

* cited by examiner

*Primary Examiner* — Alicia Torres
(74) *Attorney, Agent, or Firm* — Maynard Cooper & Gale, P. C.; Jon E. Holland

(57) ABSTRACT

An automated lawn mower has a frame that is attached to a conventional lawn mower to retrofit the conventional lawn mower for automated lawn cutting operations. In some embodiments, one or more wheels of the conventional lawn mower are removed, and the frame is coupled to the lawn mower at one or more connection points for the removed wheels. The frame is coupled to a motor, a controller, and a plurality of wheels. During operation, the motor drives the wheels under the control of the controller in order to move the automated lawn mower over a lawn for grass cutting operations.

8 Claims, 2 Drawing Sheets

US 11,483,967 B1

METHOD OF CONVERSION TO AUTOMATED LAWN MOWER

CROSS REFERENCE TO RELATED APPLICATION

This application claims priority to U.S. Provisional Application No. 62/628,694, entitled "Remote Controlled Lawn Mower" and filed on Feb. 9, 2018, which is incorporated herein by reference.

RELATED ART

Autonomous lawn mowers have been developed for cutting grass without requiring a user to push or ride the lawn mowers. Such autonomous lawn mowers are specially-designed to detect and avoid obstacles while at the same time attempting to provide full coverage of a user's lawn. Indeed, the designs of autonomous lawn mowers are typically complex and expensive, potentially limiting their adoption by consumers. Techniques for reducing the complexity and cost of autonomous lawn mowers are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
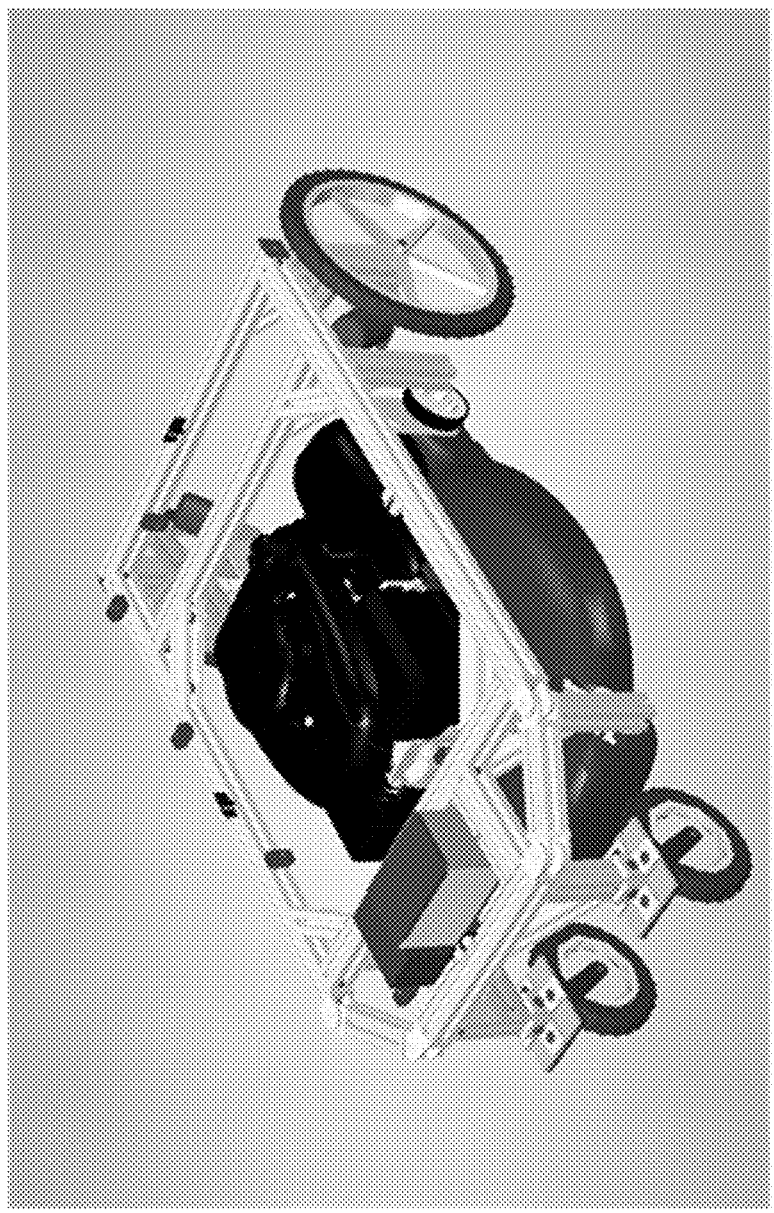
FIG. 1 is an isometric view of an automated lawn mower in accordance with some embodiments of the present disclosure.
Figure 2:
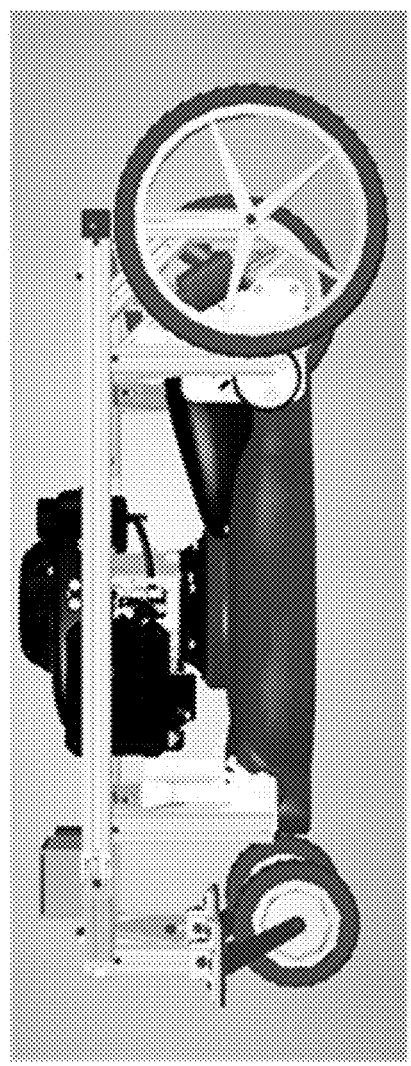
FIG. 2 is a side view of the automated lawn mower depicted by FIG. 1.

An automated lawn mower, such as a remote-controlled (RC) lawn mower or an autonomous lawn mower, in accordance with an embodiment of the present disclosure comprises an attachment designed to turn a regular push mower into an automated lawn mower, as shown by FIG. 1 and FIG. 2. The wheels from the original lawn mower may be removed to allow the attachment to mount to the lawn mower. A frame attachment mounts to the lawn mower directly at the location of the original lawn mower wheels. The cutting height adjusters found on the lawn mower may function to adjust the cutting height. The frame may be constructed from T-slot extruded aluminum to allow for modularity between different sizes of lawn mowers. There is adjustability in both the width and length of the frame, allowing any size push mower to be mounted to the frame.

Caster wheels located on the front of the frame and separate drive motors for the rear wheels allow for a zero turn radius. These motors can be powered through two different methods, either generator/alternator coming from the lawn mower engine, or battery powered.

The automated lawn mower may also include a bumper on the frame attachment which detects collisions with objects and shuts the mower off when detected. There are also object detection sensors mounted around the frame to detect objects as they come near the automated lawn mower.

This automated lawn mower may include a battery for powering a motor to move the mower under remote control by a user or autonomous control by a controller. This battery can be charged through the use of a docking station, the user manually plugging the battery in to charge, or solar panels on the automated lawn mower to charge the batteries as it is being used. Once again, the attachment mounts to the mower as described above, and the bumpers detect when an object is collided with, shutting the lawn mower off. The object detection sensors collect data and provide input to the user through visual and audio cues, informing them that the lawn mower is approaching an obstacle, such as when mowing along a fence, or towards a tree. The remote control has a safety switch that may be depressed at all times by the user for the lawn mower engine to be running. If the safety switch is released the lawn mower engine cuts off, stopping the blades. The user controls the movement, both direction and speed, of the Automated lawn mower through the use of the remote control.

In some embodiments, the wheels from the original lawn mower may be removed to allow the attachment to mount to the lawn mower. A frame attachment mounts to the lawn mower directly at the location of the original lawn mower wheels. The cutting height adjusters found on the lawn mower may function to adjust the cutting height. The frame may be constructed from T-slot extruded aluminum to allow for modularity between different sizes of lawn mowers. There is adjustability in both the width and length of the frame, allowing any size push mower to be mounted to the frame.

Caster wheels located on the front of the frame and separate drive motors for the rear wheels allow for a zero turn radius. These motors can be powered through two different methods, either generator/alternator coming from the lawn mower engine, or battery powered.

The automated lawn mower also features a bumper on the frame attachment which detects collisions with objects and shuts the mower off when detected. There are also object detection sensors mounted around the frame to detect objects as they come near the automated lawn mower.

In one embodiment, the automated lawn mower is autonomous. The attachment mounts to the lawn mower as described above, and the bumper and object detection sensors collect data as the lawn mower moves through the yard. The data collected controls the motors (Steering and speed) and the engine/blades (on or off). This keeps the automated lawn mower from hitting any obstacles found in the yard. Software and GPS can be used to map the user's yard, noting obstacles and the size/location of the yard. This mapping can then be uploaded to the automated lawn mower's onboard controller to ensure that the entire yard gets mowed using real time GPS tracking of the Automated lawn mower as it moves through the yard and comparing it to the mapping data collected. GPS mapping also allows the automated lawn mower to know where permanent obstacles, such as trees, are located.

In one embodiment, the auto mated lawn mower is remote controlled by the user. The attachment mounts to the mower as described above, and the bumpers detect when an object is collided with, shutting the lawn mower off. The object detection sensors collect data and provide input to the user through visual and audio cues, informing them that the lawn mower is approaching an obstacle, such as when mowing along a fence, or towards a tree. The remote control has a safety switch that may be depressed at all times by the user for the lawn mower engine to be running. If the safety switch is released the lawn mower engine cuts off, stopping the blades. The user controls the movement, both direction and speed, of the Automated lawn mower through the use of the remote control.

Now, therefore, the following is claimed:

1. A method for retrofitting a lawn mower for use in automated lawn cutting operations, comprising:
   removing each of a first plurality of wheels from the lawn mower, the first plurality of wheels including at least four wheels;
   attaching a frame to the lawn mower at each of a plurality of points of the lawn mower, the frame coupled to a second plurality of wheels, a motor, and a controller, wherein the plurality of points include points from which each of the first plurality of wheels was removed from the lawn mower;
   adjusting the frame to fit a size of the lawn mower;
   driving at least one of the second plurality of wheels with the motor under the control of the controller; and
   cutting grass with the lawn mower as the lawn mower moves in response to the driving.

2. The method of claim 1, wherein the lawn mower has at least one blade for cutting the grass, wherein the frame includes a bumper, and wherein the method further comprises:
   sensing a collision with an object by the bumper; and
   stopping rotation of the at least one blade with the controller in response to the sensing.

3. The method of claim 1, wherein the frame comprises T-slot extruded aluminum.

4. The method of claim 1, wherein the adjusting comprises adjusting a width and a length of the frame.

5. A method for retrofitting a lawn mower for use in automated lawn cutting operations, comprising:
   removing each of a first plurality of wheels from the lawn mower, the first plurality of wheels including at least four wheels;
   attaching a frame to the lawn mower at each of a plurality of points of the lawn mower, the frame coupled to a second plurality of wheels, a motor, and a controller, wherein the plurality of points include points from which each of the first plurality of wheels was removed from the lawn mower; and
   adjusting the frame to fit a size of the lawn mower,
   wherein the controller is configured to control at least one of the second plurality of wheels and at least one blade of the lawn mower for cutting grass.

6. The method of claim 5, wherein the frame includes a bumper for sensing collisions with objects, wherein the lawn mower has at least one blade for cutting the grass, and wherein the controller is configured to stop rotation of the at least one blade in response to an object sensed by the bumper.

7. The method of claim 5, wherein the frame comprises T-slot extruded aluminum.

8. The method of claim 5, wherein the adjusting comprises adjusting a width and a length of the frame.

* * * * *